United States Patent
Morrissey

(10) Patent No.: US 12,513,006 B1
(45) Date of Patent: Dec. 30, 2025

(54) SECURE PROVISIONING AND ROTATION OF CERTIFICATES FOR EDGE DEVICES

(71) Applicant: Amazon Technologies, Inc., Seattle, WA (US)

(72) Inventor: Christopher Michael Morrissey, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 17/937,406

(22) Filed: Sep. 30, 2022

(51) Int. Cl.
 *H04L 9/32* (2006.01)
 *H04L 9/08* (2006.01)

(52) U.S. Cl.
 CPC .......... *H04L 9/3268* (2013.01); *H04L 9/0869* (2013.01); *H04L 9/3247* (2013.01)

(58) Field of Classification Search
 CPC .... H04L 9/3268; H04L 9/0869; H04L 9/3247
 See application file for complete search history.

(56) References Cited

U.S. PATENT DOCUMENTS

| | | | |
|---|---|---|---|
| 9,369,458 B2 * | 6/2016 | McCallum | G06F 21/335 |
| 9,515,999 B2 | 12/2016 | Ylonen | |
| 10,686,593 B2 | 6/2020 | Hamel et al. | |
| 11,082,430 B1 * | 8/2021 | Kuo | H04L 63/20 |
| 2003/0097592 A1 * | 5/2003 | Adusumilli | H04L 69/08 |
| | | | 713/168 |
| 2004/0187031 A1 * | 9/2004 | Liddle | H04L 63/20 |
| | | | 726/8 |
| 2016/0301695 A1 * | 10/2016 | Trivelpiece | H04W 12/04 |
| 2018/0007428 A1 * | 1/2018 | Veeramani | H04N 21/4431 |
| 2018/0060608 A1 * | 3/2018 | Holden | G06Q 20/38215 |
| 2020/0067708 A1 * | 2/2020 | Subba | H04L 9/3226 |
| 2020/0153623 A1 * | 5/2020 | Asanghanwa | H04L 9/3213 |
| 2020/0314089 A1 * | 10/2020 | Iasynetskyi | H04L 9/3247 |
| 2022/0113693 A1 * | 4/2022 | Poluri | H04L 67/12 |
| 2022/0173886 A1 * | 6/2022 | Sardesai | H04L 63/0428 |

* cited by examiner

*Primary Examiner* — Farid Homayounmehr
*Assistant Examiner* — Judy Bazna
(74) *Attorney, Agent, or Firm* — Robert C. Kowert; Kowert, Hood, Munyon, Rankin & Goetzel, P.C.

(57) ABSTRACT

A certificate management service (CMS) may securely provision and rotate certificates for edge devices. The CMS may pre-register a unique device ID of an edge device (e.g., provided by the device manufacturer). When the edge device is installed at the client's remote network, it is provisioned with a common bootstrap certificate that allows the edge device to initially establish a secure to connection to a local hub device and to request a client certificate. The CMS receives the request for the client certificate, which includes the unique device ID. Since the unique device ID was pre-registered at the CMS, the CMS authenticates the request for the client certificate. The CMS causes a signed client certificate to be delivered back to the edge device, which may be used by the edge device to establish subsequent secure connections.

20 Claims, 6 Drawing Sheets

SECURE PROVISIONING AND ROTATION OF CERTIFICATES FOR EDGE DEVICES

BACKGROUND

The Internet of Things (IoT) is a phrase given for the interconnection of computing devices scattered around the globe within the existing internet infrastructure. IoT devices (also referred to herein as edge devices) may be used for a variety of consumer and commercial applications. For example, a service provider may wish to monitor and control the temperature in one or more of its data centers that may be located in different geographical regions. A data center may include a network of edge devices (e.g., controllers) that may monitor the temperature and send temperature measurements to another remote data center for analysis. In some cases, the controllers must first connect to another device (e.g., a hub device) that may send the temperature measurements over the internet to the remote data center for analysis. As another example, a manufacturer may have different factory machines on local network that do not have direct access to an internet, but are able to communicate with an intermediary hub device that has direct access to the internet. Another example is a vehicle that may have different sensors on the vehicle's local network that communicate to a hub device that has direct access to the internet (e.g., via cellular or satellite signal).

An edge device may need to be authenticated by an application before the application may establish a secure connection for accepting data from the edge device. In some cases, in order to authenticate the edge device, an application (e.g., at a remote data center) may require the edge device to provide a client certificate (e.g., X.509 certificate) that has been issued for the edge device by a trusted certificate authority (CA). Therefore, a user may need to provision edge devices with a client certificate before the edge devices can be authenticated and used to provide data to a remote application. However, provisioning different edge devices with different client certificates can be a burdensome and time-consuming process.

Figure 1:
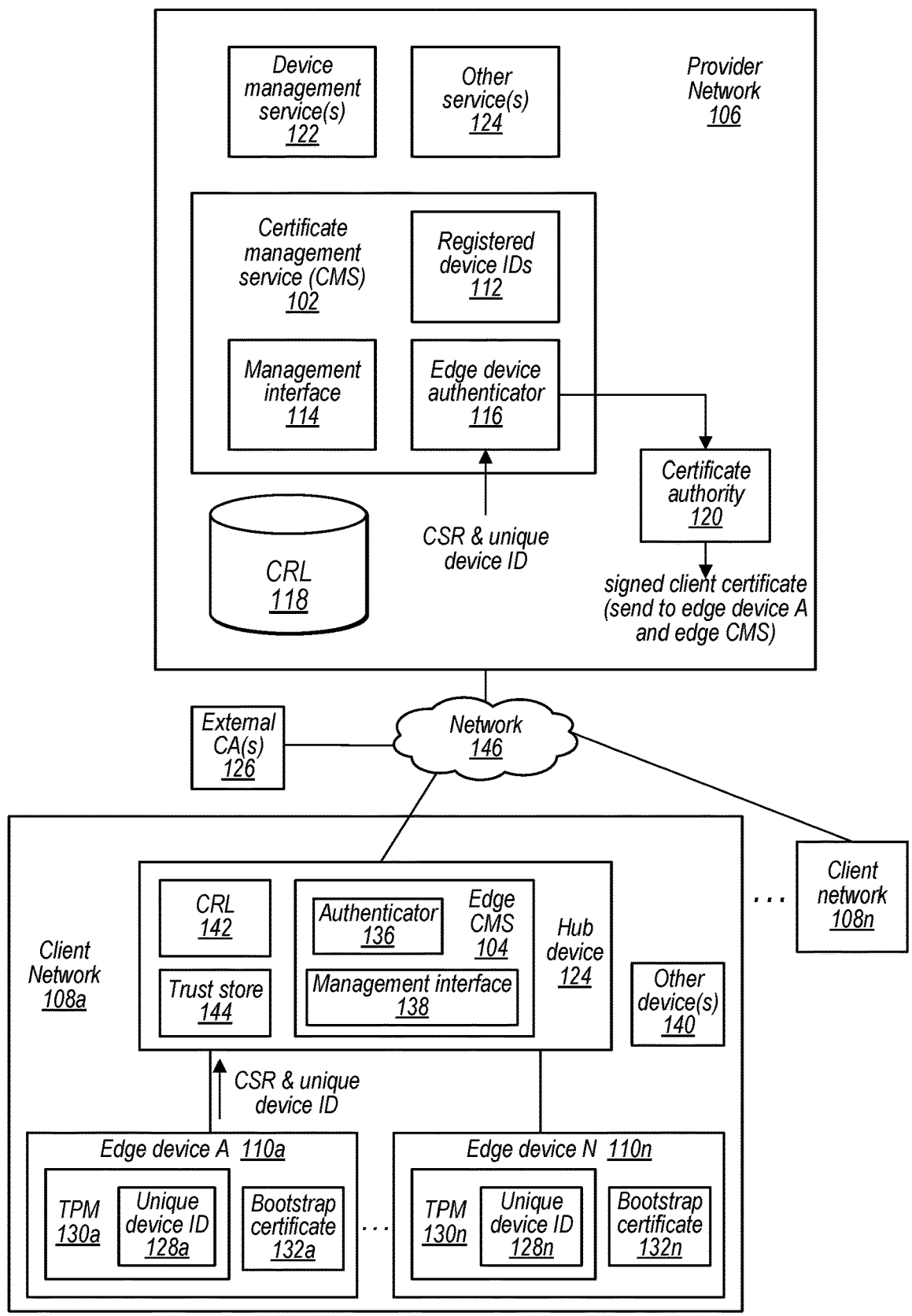
FIG. 1 illustrates a system for secure provisioning and rotation of certificates for edge devices, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for secure provisioning and rotation of certificates for edge devices. In various embodiments, in order for an edge device to establish a secure connection with a service (e.g., a service at a client network or at a remote service provider network), the service may require the edge device to provide a client certificate (e.g., an X.509 certificate). In embodiments, the client certificate that is used by an edge device for establishing secure connections has been signed and/or issued by a trusted certificate authority (CA).

When a service at a remote provider network (or a local service at a at a hub device) receives a request from an edge device to establish a connection using a secure communication protocol (e.g., via transport layer security (TLS)), the service may authenticate the edge device by verifying the digital signature of the CA on the client certificate that is provided by the edge device as part of the connection request (e.g., a common bootstrap certificate or a client certificate, as discussed below). Various embodiments describe how a client certificate may be securely provisioned and rotated/changed for edge devices at a remote/isolated client network.

In embodiments, in order to allow for secure provisioning and rotation of certificates for an edge device at a remote/isolated network of a client, a certificate management service (CMS) at a service provider's network may register a device identifier (ID) for an edge device (e.g., in response an API call to register the device ID). The device ID may uniquely identify a particular edge device with respect to any other edge devices that may communicate with the provider network. In embodiments, the device ID matches a unique ID that is stored at a secure location of the edge device (e.g., stored in a trusted platform module (TPM) of the edge device). At a later point in time, the CMS may receive a certificate signing request (CSR) and the unique ID from the edge device, as discussed below (e.g., after the edge device is installed/added to a remote/isolated network of a client).

In embodiments, the CMS may receive the CSR along with the unique device ID via a secure connection that is based on a common bootstrap certificate of the edge device (e.g., a common client certificate that may be provisioned onto multiple edge devices at the client network). For example, an edge device may either be pre-provisioned with a common bootstrap certificate before it is shipped to a client site or the edge device may be provisioned with the common bootstrap certificate after it is connected to the client's local network (e.g., downloaded from a remote provider network or installed by a network administrator at the client site).

In embodiments, the edge device may first establish a secure connection with an "edge CMS" at a hub device of the client's local network by providing the common bootstrap certificate to the edge CMS (e.g., using mutual authentication/TLS). After the edge CMS authenticates the edge device based on the common bootstrap certificate, the edge CMS may receive the CSR and the unique device ID from the edge device and then send/forward the CSR and the unique device ID to the CMS.

In embodiments, the CSR may include any relevant or suitable information to be included on the signed client certificate. In embodiments, the information to be included on the signed client certificate may include a public key that was generated by the edge device (e.g., part of a public/private key pair) and/or any other information.

When the CMS receives the CSR and the device ID, the CMS may authenticate the edge device based on the device ID and based on the prior registration of the device ID with the certificate management service. For example, the CMS may determine whether device ID received from the edge device matches any of the device IDs that have been previously registered by the CMS. If the CMS determines that the device ID received from the edge device has been registered (e.g., by determining that the device ID received from the edge device matches one of the registered device IDs), then the CMS may authenticate the edge device.

In response to the authentication of the edge device, the CMS may cause a signed client certificate to be generated for the edge device based on the CSR (e.g., using information in the CSR, such as the client certificate to be signed and/or information to be included on the signed client certificate). For example, the CMS may send the client certificate to be signed to a CA of the provider network, receive the client certificate after it is signed by the CA, and send/deliver it to the edge device. In some embodiments, the CA itself may send/deliver the client certificate to the edge device after it is signed.

FIG. 1 illustrates a system for secure provisioning and rotation of certificates for edge devices, according to some embodiments.

In embodiments, the certificate management service (CMS) 102, the edge CMS 104, and/or any other components depicted in FIG. 1 may be the same as (or include one or more of the same components) as the CMS, the edge CMS, and/or any other components depicted in any of FIGS. 2-5. FIG. 6 depicts an example computer system(s) that may implement the services, networks, and/or any other components depicted in any of FIGS. 1-5.

In embodiments, the CMS 104 may securely provision and rotate client certificates for any number edge devices of any given client (e.g., an entity such as a private company, an individual, or a public organization). For example, a client may own/manage the client network 108a, which may include any number of edge devices 110a-110n. As shown, the CMS 104 may securely provision and rotate client certificates for edge devices for any number of clients that each own/manage one or more client networks. For example, another client may own/manage the client network 122n.

In the depicted embodiment, the CMS 104 may securely store any number of registered device IDs 112 that each match a unique device ID that is stored at a secure location within different edge device (e.g., a TPM). A given device ID of an edge device may be securely stored by the CMS 104 in response to a request received by the CMS 104 (e.g., in response to an application programming interface (API) request received by the CMS via the management interface 114).

In some embodiments, a user or administrator at a device manufacturer/supplier network or at a client network 108 may use a graphical user interface (GUI) or a command line interface (CLI) to securely upload the device ID to the CMS via the interface 114 (or to configure any other aspects of the CMS and/or other components/services of the provider network). The CMS 104 also includes an edge device authenticator 116, which may authenticate an edge device, cause a client certificate to be generated/signed for the edge device, and/or perform any of the other actions described herein.

As shown, the provider network may include a certification revocation list (CRL 118) and a certificate authority (CA 120) that are used by the CMS 102 (in various embodiments, the CRL, the CA, and/or any other components/functionality may be considered a part of the CMS itself). The provider network may also include any number of device management services 122 and/or other services 124 that each may perform at least some of the functionality described herein, in embodiments. For example, other services 124 may include a database service that stores the CRL 118 or a certificate manager service that implements the CA 120. In embodiments, the CMS may use one or more external CAs 126 (e.g., at a remote network) instead of or in additional to the internal CA 120 of the provider network.

In embodiments, an edge device is provisioned with a unique device ID 128 by storing the device ID in a secure location within the edge device. For example, a manufacturer or supplier of the edge device may store the device ID in a TPM 130 of the edge device. The edge device may also be provisioned with a common bootstrap certificate 132 that will be used by the edge device to initially establish a secure connection in order to send a CSR and device ID to the CMS via the edge CMS 104. In embodiments, the common bootstrap certificate may be downloaded from the provider network or other source as part of the device provisioning process (e.g., along with any other client software to provision the device).

In the depicted embodiment, an intermediary device (e.g., the hub device 134) may be used in order to allow the edge devices to communicate over the internet with the CMS of the provider network and/or with any other remote endpoint. In embodiments, an edge device may not be able to communicate directly with any remote networks, and communicates indirectly with the provider network 106 via the hub device 124. The client network may be considered a remote and/or isolated network with respect to the provider network, and the hub device 134 may act as a communication bridge between the edge devices and the CMS (although in some embodiments, an edge device(s) of the client network and/or a stand-alone edge device(s) such as a smart phone or other cellular device may be able to directly communicate with the provider network/CMS).

As shown, the hub device 134 may include an edge CMS 104 that may perform various functions, including at least some or all of the functionality described for the CMS 102, in embodiments. The edge CMS 104 includes an authenticator 136 that may be used to authenticate an edge device (e.g., based on a common bootstrap certificate or client certificate). The edge CMS 104 also includes an edge management interface 138. Similar to the management interface 114 of the CMS 102, the edge management interface may be used by a user or administrator (e.g., via another computing device 140) to configure various aspects of the edge CMS (or other components of the hub device).

As depicted, the hub device also includes an edge CRL 142. In embodiments, the edge CRL 142 may be updated by the CMS when the CRL 118 is updated, in order to keep the CRLs in synch. In some embodiments, the edge CRL 142 may be updated and then the CRL 118 may be updated to keep the CRLs in synch (e.g., in response to a user/admin manually revoking a certificate at the edge CMS). The hub device also includes a trust store 144 (e.g., to securely store a CA certificate, client certificates, and/or bootstrap certificates). In some embodiments, the provider network (including the CMS 102, the CA 120), the external CA 126, the client networks 108, and any other number of remote devices, services, and/or networks may communicate with each other via a wide area network 146 (e.g., the internet).

As mentioned above, in embodiments, the hub device may be able to directly connect to the wide area network 146 in order to directly communicate with the provider network 106 (and the CMS 102), but the edge devices 110 may not be able to directly connect to the wide area network 146 and therefore may not directly communicate with the provider network 106 (or the CMS 102). In other words, the edge devices 110 may not have direct access to the provider network, but they may have direct access to the hub device. Therefore, to communicate with the CMS of the provider network (e.g., to send the CSR and device ID), an edge device may first need to establish a secure connection with the hub device based on a common bootstrap certificate of the edge device. The CMS of the provider network may then receive, from the edge device via the secure connection between the edge device and the hub device, a certificate signing request and the device ID.

In embodiments, the CMS may receive, from an endpoint (e.g., a manufacturer and/or supplier of the edge device), a device ID of the edge device, wherein the device ID uniquely identifies the edge device. In response to the reception of the device ID, the CMS may register the device ID with the CMS (securely storing the device ID at the provider network). In embodiments, secure storage of the device ID by the CMS or by an edge device may prevent access to the device ID by any number of services/applications and/or users (e.g., due to lack of permission to access the device ID).

After the registration of the device ID with the CMS, the CMS may receive, from the edge device of the remote network of the client (e.g., edge device A 110*a*), via a secure connection based on a common bootstrap certificate of the edge device (e.g., a secure connection between the edge device and the edge CMS 104), a CSR that includes the device ID (the device ID matches a unique ID stored at a secure location within the edge device, such as a TPM). The CMS may then authenticate the edge device based on the device ID of the CSR and on the prior registration of the device ID with the CMS. For example, the CMS may determine that the device ID of the CSR matches one of the registered device IDs 112 securely stored at the CMS.

In response to the authentication of the edge device, the CMS may cause a client certificate to be generated for the edge device based on the CSR (e.g., using the client certificate provided by the CSR and/or information provided by the CSR). The client certificate may then be signed by a CA 120 of the provider network and delivered to the edge device. In some embodiments, the client certificate may then be signed (and delivered) by an external CA 126.

In various embodiments, the types of requests that may be accepted by the CMS from the edge device may be limited. The types of requests may be limited because the trust level of the common bootstrap certificate that was used to establish the secure connection with the edge CMS and/or the CMS is a lower level of trust than a client certificate that has been signed by the CA 120 or external CA 126 (e.g., after authentication of the unique device ID by the edge device authenticator 116).

For example, the CMS may receive, from another edge device, via a secure connection based on the common bootstrap certificate of the other edge device, another request that may be a different type of request (e.g., a request to send temperature data or other data that was collected by a sensor, or a request to receive temperature data from the provider network). Based on a policy that limits types of requests that may be accepted over connections based on the common bootstrap certificate, the CMS may reject the other request (e.g., the policy may indicate that requests to send temperature data or to receive temperature data may not be accepted). In some embodiments, the policy may prevent a request from being accepted unless the request is a CSR (e.g., a request for a signed certificate (trusted certificate) and the unique device ID is also received).

In embodiments, after the client certificate has been signed and delivered back to the edge device, the edge device may use that client certificate to establish subsequent secure connections with the CMS and/or the edge CMS. In embodiments, the client certificate may expire after a time period. Therefore, the edge device may send another CSR in order to request a new client certificate to be signed (e.g., to rotate the client certificate). In such cases, the CMS may allow the CSR to be accepted based on the use of the current client certificate (without the need to authenticate based on the unique device ID again).

For example, the CMS may receive, from the edge device, via a secure connection based on the client certificate, another CSR (e.g., after a secure connection has been established between the edge device and the hub/intermediary device of the remote network based on authentication of the client certificate). The CMS may cause a new client certificate to generated for the edge device based on the other CSR (e.g., based on information in the CSR), wherein the new client certificate is signed by the CA (or external CA) and delivered to the edge device.

The above process of securely provisioning and rotating a client certificate may be performed for any number of edge devices of the client network, using the same common bootstrap certificate and different unique device IDs for each edge device. This may provide a convenient way to efficiently distribute a common bootstrap certificate to many edge devices, when can be used be each edge device in order to obtain a client certificate that is unique to that edge device.

In some embodiments, the CMS may register a device ID of an edge device in response to receiving an API call to register the device ID (e.g., via the management interface 114), wherein the API call comprises the device ID. In embodiments, in response to receiving the device ID (e.g., via the API call), the CMS may associate the common bootstrap certificate with the device ID.

In an embodiment, the CMS may select a particular common bootstrap certificate from among any number of common bootstrap certificates that are available in a data store, and then associate the selected certificate with the device ID. In some embodiments, the selection may be made randomly (e.g., using a random algorithm) or may be made based on the type of the edge device. In some embodiments, using different bootstrap certificates for different edge devices or different types of edge devices may provide an additional level of security.

In embodiments, a client certificate may be revoked (e.g., in the event that a certificate is or may be compromised). In response, the CMS or the CA may add the revoked certificate to the CRL 118. In embodiments, the CMS or the edge CMS may receive, via the management interface 114 or edge management interface 138, an indication that a particular client certificate has been revoked and in response, the local CRL as well as the remote CRL may be updated to include the revoked certificate. For example, if a user revokes a certificate using the edge CMS, the CMS 102 at the provider network may receive, from the edge CMS, an indication that the client certificate has been revoked and in response, add the client certificate to CRL 118 at the provider network (synching the CRL 118 with the edge CRL 142).

In various embodiments, communication between different devices and/or services is authenticated using certificates (e.g., PKI certificates) in order to ensure secure communication. By rotating certificates (e.g., replacing a currently used certificate with a new certificate), a certificate is only valid for a certain amount of time and is therefore less likely to be obtained and/or used by an attacker, resulting in a higher degree of security/protection from potential attacks. In embodiments, the CMS automatically rotates certificates (e.g., on a predefined schedule or based on expiration date), avoiding the need for manual rotation. For example, according to a schedule, the CMS may send a request/command to an edge device that causes the edge device to send a CSR to the CMS to request a new client certificate to be signed. In some embodiments, a user/admin may define the expiration data, common name, and any other information for a client certificate for any number of edge device (e.g., via a UI/management interface).

In some embodiments, a new controller (e.g., edge device) may need a mechanism to connect to the service layer (e.g., edge CMS) that ensures that it is properly authenticated and that the connection is encrypted before the service layer can trust any data gathered from the device the controller is monitoring. To do this, in addition to a copy of an IoT Device Client (e.g., software/functions), the controller image is deployed with the common bootstrap certificate and the CA certificate for the service layer. This initial bootstrap certificate is considered less secure because its container, the base OS image, may move around over the networks, with its private key in tow, on its path to be installed on the controller.

Before deployment of the image to the controller, a unique device ID of the controller is registered with the CMS. During this process, the identifier is securely stored by the CMS. A data structure may associate the common bootstrap certificate and the unique ID. Once installed and the base OS image provisioned, the controller makes its first connection to the edge CMS. During this initial connection, the controller authenticates itself by passing the unique ID over the connection secured by the bootstrap certificate and then requests and receives a new, fully trusted certificate (e.g., fully authorized certificate).

In embodiments, because of the lower level of security associated with the bootstrap certificate, an attached policy limits the capabilities available through its connection to those required only to provision a new fully trusted certificate. The new certificate is delivered using the normal certificate rotation process. Once complete, the normal policy may be attached to the certificate, allowing the edge device to operate freely (e.g., to send any number of other types of requests, other than a request for a new certificate).

In some embodiments, a CSR may include an endorsement key public certificate and/or identity information (e.g., name, description, location, group). In embodiments, a policy defined at the provider network/service may by associated with the device's unique ID. The policy may determine what capabilities/actions that the edge device may be able to perform (e.g., what types of requests the edge device may make).

Figure 2:
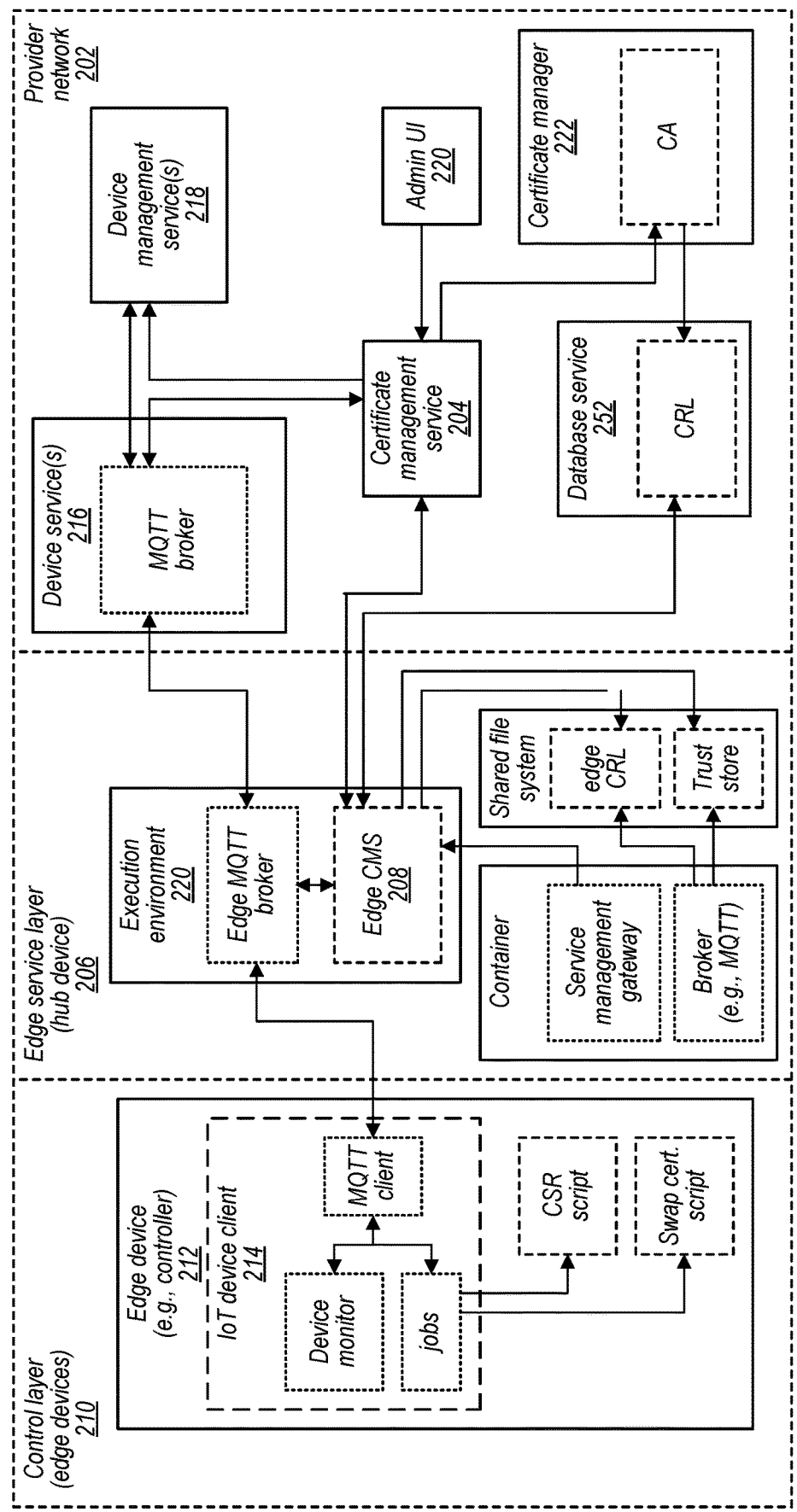
FIG. 2 illustrates a system for secure provisioning and rotation of certificates for edge devices, according to some embodiments.

FIG. 2 illustrates a system for secure provisioning and rotation of certificates for edge devices, according to some embodiments.

In the depicted example, the provider network 202 (e.g., provider network 106) includes a CMS 204 (e.g., CMS 102), an edge service layer 206 may implement an edge CMS 208 (e.g., on a hub device 134), and a control layer 210 may include an edge device 212 (e.g., a controller or other type of IoT device). As shown, communication between the layers may be performed according to a message queue telemetry transport (MQTT) protocol.

The IoT device client 214 (e.g., software provided by the provider network 202) at the edge device 212 may include an MQTT client that communicates with an edge MQTT broker at the edge service layer, which in turn communicates with an MQTT broker at the provider network. However, in various embodiments, any other suitable type of communication protocol may be used between any of the layers/services.

As shown, the IoT device client 214 may include device monitoring functions and may perform various jobs (e.g., scripts to generate CSRs and scripts to swap/rotate client certificates used by the edge device). The service layer 206 includes an execution environment that runs the edge MQTT broker and the edge CMS 208. In the depicted embodiment, the edge CRL and the trust store may be part of a shared file system. For example, both the edge CMS and other software (e.g., another MQTT broker and a service management gateway) may update/access the edge CRL and the trust store. This may allow software from a third-party (e.g., executing in a separate container) to access/update the same edge CRL and trust store used by the edge CMS.

In embodiments, the trust store may store any of the client certificates used by edge devices and/or the CA certificate of the CA(s) at the provider network and/or external networks. In embodiments, the edge CMS may use the CA certificate to authenticate an edge device based on a client certificate that has been signed by the CA (e.g., by using the public key of the CA certificate).

In the example embodiment, the provider network 202 includes a device service 216 that implements an MQTT broker. The CMS 204 may communicate with the device service 216 as well as any number of other device management services 218. An administrator at the provider network may access the CMS 204 via an admin UI 220.

As shown, the CMS 204 may communicate with a certificate manager 222 service that implements the CA that signs client certificates. A database service 224 may implement the CRL at the provider network. In embodiments, the edge CMS may update the CRL at the database service 224 or the edge CMS may receive updates from the database service 224 in order to update the edge CRL (e.g., to add/remove certificates to/from the CRL).

Figure 3:
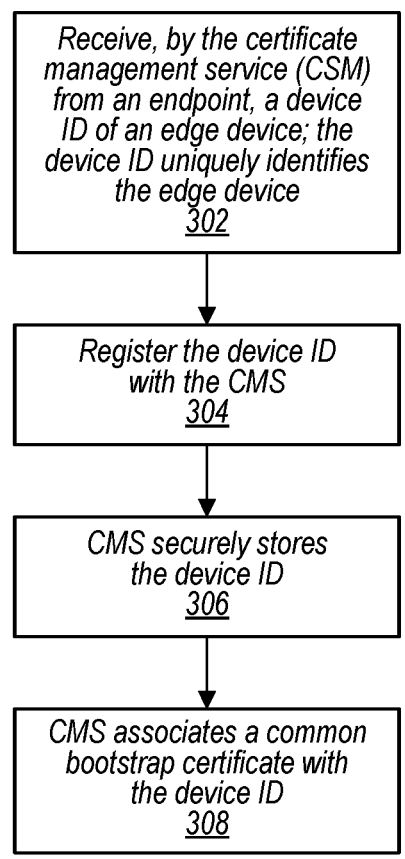
FIG. 3 is a flow diagram that illustrates a certification management service (CMS) that registers a device ID, according to some embodiments.

FIG. 3 is a flow diagram that illustrates a certification management service (CMS) that registers a device ID, according to some embodiments.

At block 302 the CMS receives, from an endpoint, a device ID of an edge device; the device ID uniquely identifies the edge device. At block 304, the CMS registers the ID with the CMS. At block 306, the CMS securely stores the device ID. At block 308, the CMS associates a common bootstrap certificate with the device ID. As discussed herein, the CMS may select a particular common bootstrap certificate to be associated with the device ID.

Figure 4:
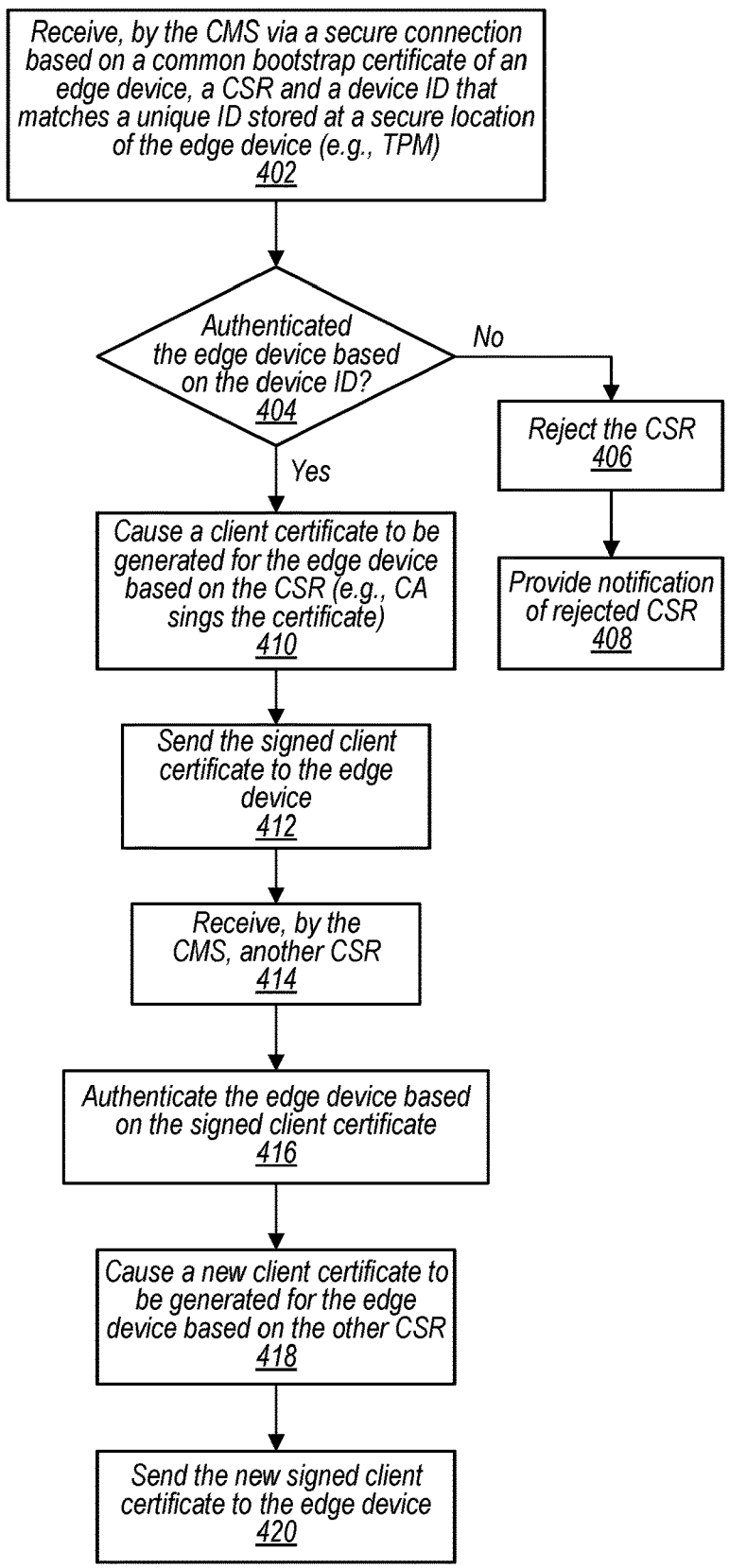
FIG. 4 is a flow diagram that illustrates secure provisioning and rotation of certificates for edge devices, according to some embodiments.

FIG. 4 is a flow diagram that illustrates secure provisioning and rotation of certificates for edge devices, according to some embodiments.

At block 402, the CMS receives, via a secure connection based on a common bootstrap certificate of an edge device, a CSR and a device ID that matches a unique ID stored at a secure location of the edge device (e.g., in a TPM). In embodiments, the CMS receives a message that includes at least the CSR and the device ID. At block 404, the CMS determines whether the edge device is authenticated based at least on the device ID (e.g., determining if the device ID matches a securely stored device ID). If not, then the CMS rejects the CSR at block 406 and at block 408, and the CMS provides a notification of the rejected CSR (e.g., to an administrator email/account).

Returning to block 404, if the CMS authenticates the edge device based on the device ID, then at block 410, the CMS causes a client certificate to be generated and/or signed for the edge device based on the CSR (e.g., the CA generates a signed certificate based on information provided in the CSR). At block 412, the CMS (or CA) sends the signed client certificate to the edge device.

At block 414, the CMS receives another CSR and the signed client certificate from the edge device (e.g., at a later time after the edge device receives/uses the signed client certificate, when the signed client certificate needs to be rotated for purposes of maintaining a high level of security). At block 416, the CMS causes a new signed client certificate to be generated from the edge device based on the CSR (e.g., without requiring authentication based on the unique device ID, since the CMS may authenticate the edge device based on the signed client certificate that was previously provided to the edge device). At block 420, the CMS (or CA) sends the new signed client certificate to the edge device.

In embodiments, the device ID may be unique to each edge device and may be randomly generated for each edge device (or based on a randomly generated number/value) and stored within the secure area of each edge device before it is shipped to the client (e.g., at the client's site/location). For example, the manufacturer or supplier of the edge device may generate the unique device ID and store it into the secure area of the edge device (e.g., the TPM) or the manufacturer or supplier may cause the edge device to generate the unique device ID and to store it into the secure area. This may provide an additional level of security compared to other techniques (e.g., using a media access control (MAC) address as the device ID), because the generated device ID of a given edge device may be independent of the device IDs of any other edge devices that may have been manufactured and/or supplied as part of the same batch/group of edge devices. Therefore, if an attacker obtains the device ID for a particular edge device, the attacker may be unable to use the device ID to determine or calculate the device ID of another edge device (even if they were manufactured as part of the same batch/group).

Figure 5:
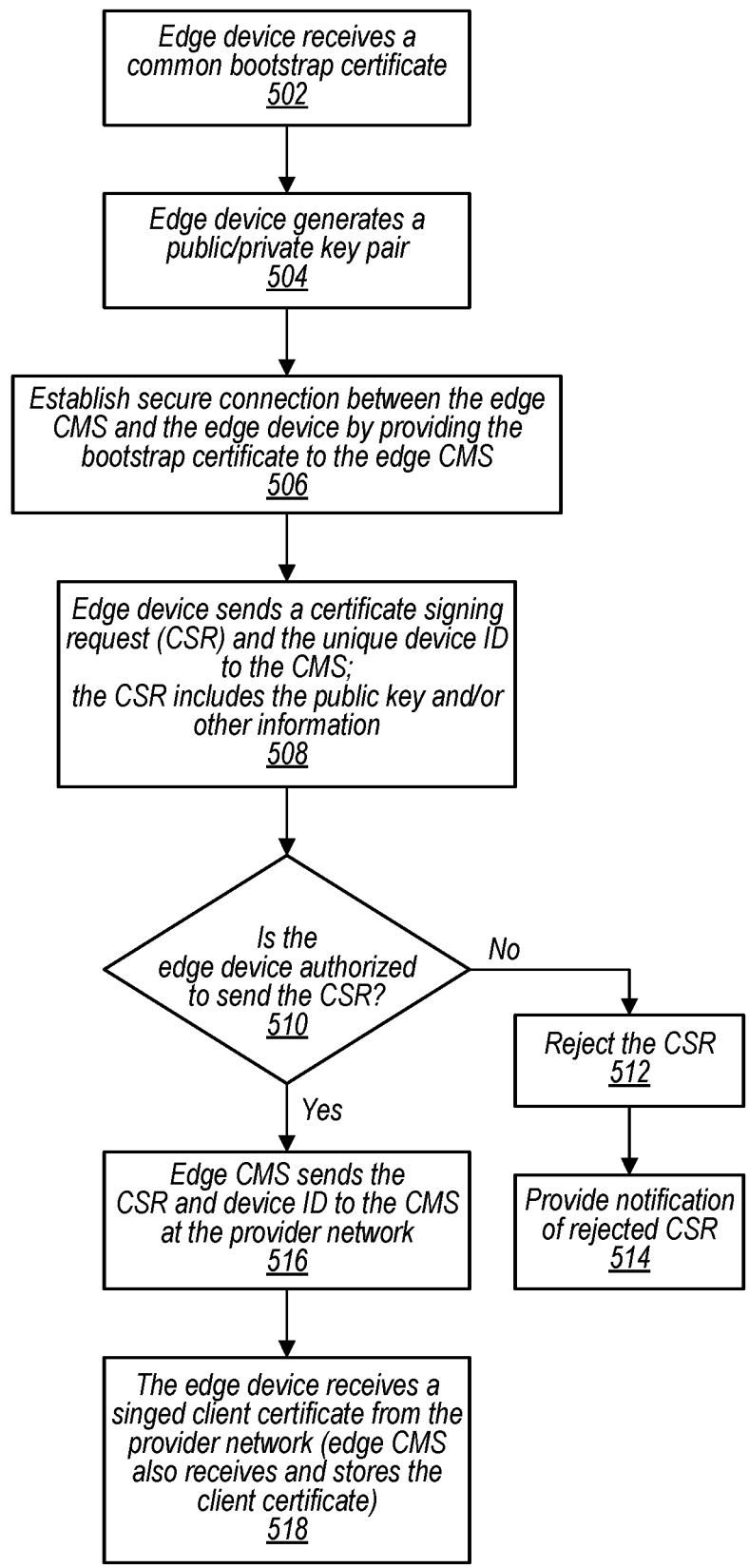
FIG. 5 is a flow diagram that illustrates secure provisioning of a certificate for an edge device, according to some embodiments.
Figure 6:
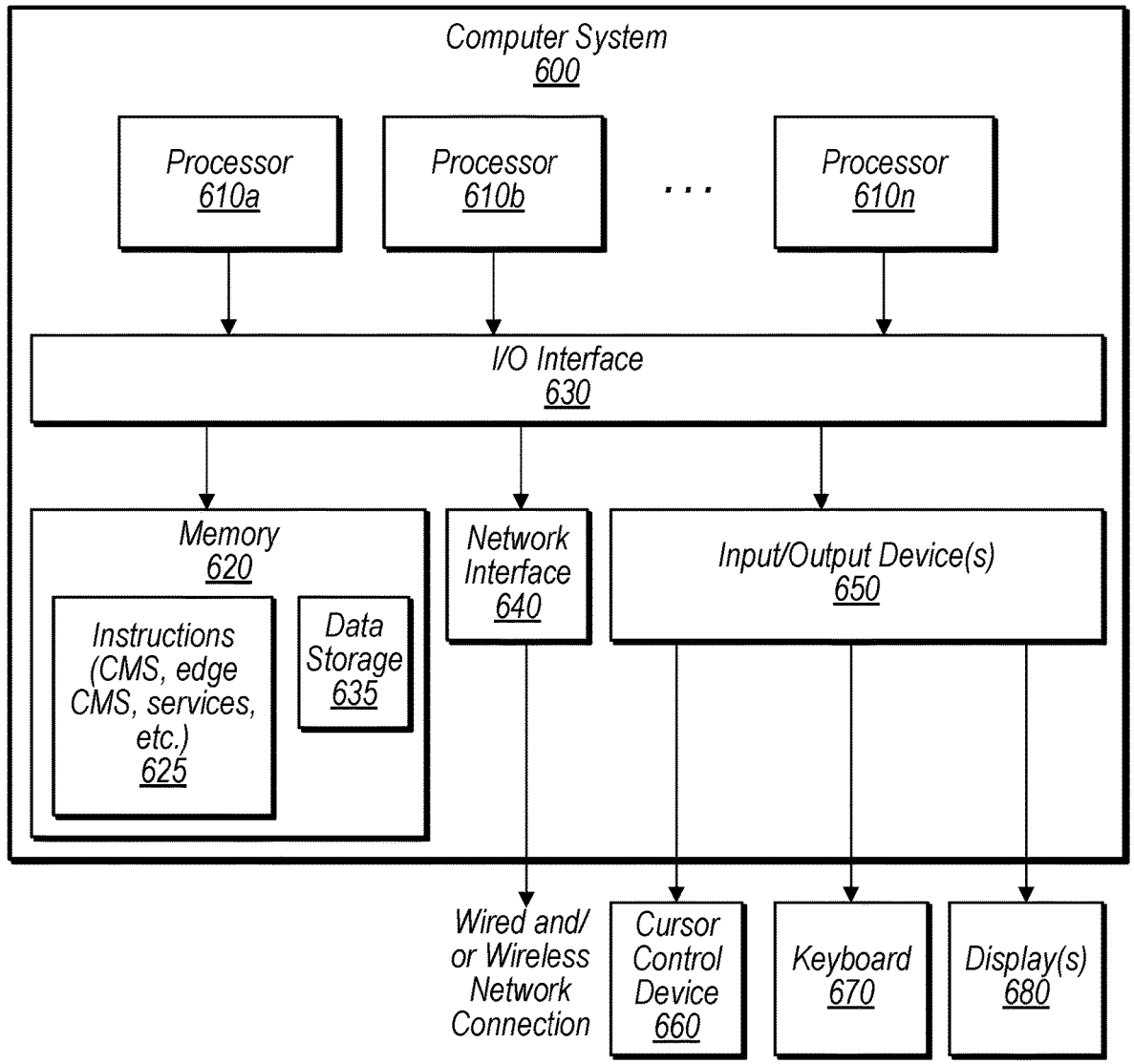
FIG. 6 is a block diagram illustrating an example computer system that implements some or all of the techniques described herein, according to some embodiments.

FIG. 5 is a flow diagram that illustrates secure provisioning of a certificate for an edge device, according to some embodiments.

At block 502, an edge device receives a common bootstrap certificate (e.g., as part of the provisioning process for the edge device). At block 504, the edge device generates a public/private key pair. In embodiments, the private key may be kept within a secure area (e.g., TPM). At block 506, the edge device establishes a secure connection between an edge CMS and the edge device by providing the bootstrap certificate to the edge CMS. In embodiments, when the edge CMS receives the bootstrap certificate from the edge device, the edge CMS authenticates the edge device based on the bootstrap certificate and establishes the secure connection between the edge CMS and the edge device (if the bootstrap certificate is rejected, then no secure connection is established between the edge CMS and the edge device). At block 508, after the secure connection is established, the edge device sends a CSR and the unique device ID to the edge CMS. The CSR may include the public key and/or other information.

At block 510, in response to receiving the CSR and/or the unique device ID, the edge CMS determines whether the edge device is authorized to send the CSR and/or the unique device ID to the CMS of the provider network. In embodiments, the edge device may be limited to sending certain types of requests to the CMS based on the bootstrap certificate authentication. For example, the edge device may be limited to CSRs. If the CMS determines that the edge device is not authorized to send the CSR based on the common bootstrap certificate (e.g., the request may be incorrectly formatted or be an unauthorized type of CSR), then the edge CMS rejects the CSR at block 512 and at block 514, the edge CMS provides a notification of the rejected CSR at block 512 (e.g., to an administrator email/account).

Returning to block 510, if the edge CMS authenticates the edge device is authorized to send the CSR and/or the unique device ID to the CMS), then at block 516, the edge CMS sends the CSR and the device ID to the CMS at the provider network (e.g., forwards the CSR and the device ID to the CMS at the provider network). At block 518, the edge device receives a signed client certificate from the provider network. In embodiments, the CMS may send the signed client certificate to the edge CMS (which then sends it on to the edge device) or the CMS may send the signed client certificate directly to the edge device. In embodiments, the edge CMS also receives the signed client certificate from the provider network, in order to authenticate the edge device at a later time and/or to update the edge CRL in the event that the signed client certificate is revoked by the CMS or other entity at a later time.

Any of various computer systems may be configured to implement processes associated with the CMS, edge CMS, the services, networks, or any components of the above figures. For example, FIG. 6 is a block diagram illustrating an example computer system that implements some or all of the techniques described herein, according to some embodiments.

In various embodiments, the CMS, edge CMS, the services, networks, or any components of any of FIGS. 1-5 may each include one or more computer systems 600 such as that illustrated in FIG. 6. In embodiments, the CMS, edge CMS, the services, networks, or any components may include one or more components of the computer system 600 that function in a same or similar way as described for the computer system 600.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or downloadable application, while in other embodiments servers may include more, fewer, or different elements than computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be embedded processors implementing any of a variety of instruction set architectures (ISAs), such as the x 106, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the certificate revocation manager, the services, etc.), are shown stored within system memory 620 as program instructions 625. In some embodiments, system memory 620 may include data 635 which may be configured as described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610).

In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other computer systems 600 or devices attached to a network, such as the local network discussed above, a wide-area network, or a local network within the provider network, for example. In particular, network interface 640 may be configured to allow communication between computer system 600 and/or various I/O devices 650. I/O devices 650 may include scanning devices, display devices, input devices and/or other communication devices, as described herein. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 600 via I/O interface 630. A computer-readable storage medium may also include any volatile or non-volatile media such as RAM (e.g., SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

In some embodiments, I/O devices 650 may be relatively simple or "thin" client devices. For example, I/O devices 650 may be configured as dumb terminals with display, data entry and communications capabilities, but otherwise little computational functionality. However, in some embodiments, I/O devices 650 may be computer systems configured similarly to computer system 600, including one or more processors 610 and various other devices (though in some embodiments, a computer system 600 implementing an I/O device 650 may have somewhat different devices, or different classes of devices).

In various embodiments, I/O devices 650 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 650 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 600. In general, an I/O device 650 (e.g., cursor control device 660, keyboard 670, or display(s) 680 may be any device that can communicate with elements of computing system 600.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the certificate revocation manager, the services, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more processors and one or more memories, wherein the one or more memories have stored thereon instructions, which when executed by the one or more processors, cause the one or more processors to implement certificate management service for a plurality of clients of a provider network, wherein the certificate management service is configured to, for individual clients of the certificate management service:
receive, from an endpoint, a device ID of an edge device, wherein the device ID uniquely identifies the edge device;
in response to the reception of the device ID, register the device ID with the certificate management service, wherein the certificate management service securely stores the device ID;
subsequent to the registration of the device ID with the certificate management service:
receive, by the provider network from the edge device of a remote network of the client that is remote from the provider network, via a secure connection between the edge device and a hub device of the remote network, a certificate signing request and the device ID, wherein the certificate signing request and the device ID is sent from the edge device to the provider network subsequent to establishment of the secure connection between the edge device and the hub device within the same remote network based on sending the common bootstrap certificate from the edge device to the hub device within the same remote network, wherein the device ID matches a unique ID stored at a secure location within the edge device, and wherein the edge device does not have direct access to the provider network;
authenticate the edge device based on the device ID received from the edge device and on the prior registration of the device ID with the certificate management service; and
in response to the authentication of the edge device, cause a client certificate to be generated for the edge device based on the certificate signing request, wherein the client certificate is signed by a certificate authority (CA) of the provider network and delivered to the edge device.

2. The system as recited in claim 1, wherein the certificate management service is further configured to:
receive, from another edge device of the remote network, via a secure connection based on the common bootstrap certificate of the other edge device, another request; and
based on a policy that limits types of requests that may be accepted over connections based on the common bootstrap certificate, reject the other request.

3. The system as recited in claim 1, wherein to register the device ID with the certificate management service, the certificate management service is further configured to:
associate the common bootstrap certificate with the device ID.

4. The system as recited in claim 1, wherein the certificate management service is further configured to:
receive, from the edge device, via a secure connection based on the client certificate, another certificate signing request that comprises the client certificate;
authenticate the edge device based on the client certificate of the other certificate signing request; and
in response to the authentication of the edge device based on the client certificate of the other certificate signing request, cause a new client certificate to be generated for the edge device based on the other certificate signing request, wherein the other client certificate is signed by the certificate authority (CA) of the provider network and delivered to the edge device.

5. The system as recited in claim 1, wherein the certificate management service is configured to:
receive another device ID of another edge device, wherein the other device ID uniquely identifies the other edge device;
in response to the reception of the other device ID, register the other device ID with the certificate management service, wherein the certificate management service securely stores the other device ID;
subsequent to the registration of the other device ID, receive, from the other edge device of the remote network, via another secure connection between the other edge device and the hub device of the remote network based on the common bootstrap certificate of the other edge device, another certificate signing request and the other device ID;
authenticate the other edge device based on the other device ID, wherein the authentication of the other edge device is based on the prior registration of the other device ID with the certificate management service; and
in response to the authentication of the other edge device, cause another client certificate to generated for the other edge device based on the other certificate signing request, wherein the other client certificate is signed by the CA and delivered to the edge device.

6. A method, comprising:
performing, by one or more computing devices of a provider network that implement a certificate management service:
receiving, by the provider network from an edge device of a remote network of the client that is remote from the provider network, via a secure connection between the edge device and a hub device of the remote network, a certificate signing request and a device ID of the edge device, wherein the certificate signing request and the device ID is sent from the edge device to the provider network subsequent to establishment of the secure connection between the edge device and the hub device within the same remote network based on sending the common bootstrap certificate from the edge device to the hub device within the same remote network, wherein the device ID uniquely identifies the edge device and matches a unique ID stored at a secure location within the edge device, and wherein the edge device does not have direct access to the provider network;
authenticating the edge device based on the device ID received from the edge device and on a prior registration of the device ID with the certificate management service; and
in response to authenticating the edge device, causing a client certificate to be generated for the edge device based on the certificate signing request, wherein the client certificate is signed by a certificate authority (CA) of the provider network and delivered to the edge device.

7. The method as recited in claim 6, further comprising performing, by the one or more computing devices:
   prior to receiving the certificate signing request from the edge device, receiving the device ID for the edge device, wherein the device ID for the edge device is based at least on a randomly generated value; and
   in response to receiving the device ID, registering the device ID with the certificate management service, wherein the certificate management service securely stores the device ID, and wherein the common bootstrap certificate is associated with the device ID.

8. The method as recited in claim 7, further comprising performing, by the one or more computing devices:
   in response to receiving the device ID, associating the common bootstrap certificate with the device ID.

9. The method as recited in claim 7, wherein receiving the device ID comprises:
   receiving an API call to register the device ID, wherein the API call comprises the device ID.

10. The method as recited in claim 6, further comprising performing, by the one or more computing devices:
    receiving, from another edge device of the remote network, via a secure connection based on the common bootstrap certificate of the other edge device, another request; and
    based on a policy that limits types of requests that may be accepted over connections based on the common bootstrap certificate, rejecting the other request.

11. The method as recited in claim 10, wherein the policy prevents a request from being accepted unless the request is for a trusted certificate.

12. The method as recited in claim 6, wherein the at the secure location within the edge device is a trusted platform module (TPM).

13. The method as recited in claim 6, wherein the certificate signing request further comprises a public key that corresponds to a private key, wherein the public key and the private key are generated by the edge device.

14. The method as recited in claim 13, wherein the certificate signing request is received from the edge device in accordance with a message queue telemetry transport (MQTT) protocol.

15. One or more non-transitory computer-accessible storage media storing program instructions that when executed on or across one or more processors of a provider network cause the one or more processors to:
    receive, by the provider network from an edge device of a remote network of the client that is remote from the provider network, via a secure connection between the edge device and an intermediary device of the remote network, a certificate signing request and a device ID of the edge device, wherein the certificate signing request and the device ID is sent from the edge device to the provider network subsequent to establishment of the secure connection between the edge device and the hub device within the same remote network based on sending the common bootstrap certificate from the edge device to the hub device within the same remote network, wherein the device ID uniquely identifies the edge device and matches a unique ID stored at a secure location within the edge device, and wherein the edge device does not have direct access to the provider network;
    authenticate the edge device based on the device ID received from the edge device and on a prior registration of the device ID with the certificate management service; and
    in response to the authentication of the edge device, cause a client certificate to be generated for the edge device based on the certificate signing request, wherein the client certificate is signed by a certificate authority (CA) and delivered to the edge device.

16. The one or more storage media as recited in claim 15, wherein the program instructions when executed on or across the one or more processors further cause the one or more processors to:
    prior to the reception of the certificate signing request from the edge device, receive the device ID for the edge device; and
    in response to the reception of the device ID, register the device ID with the certificate management service, wherein the certificate management service securely stores the device ID.

17. The one or more storage media as recited in claim 15, wherein the program instructions when executed on or across the one or more processors further cause the one or more processors to:
    receive, from another edge device of the remote network, via a secure connection based on the common bootstrap certificate of the other edge device, another request; and
    based on a policy that limits types of requests that may be accepted over connections based on the common bootstrap certificate, reject the other request.

18. The one or more storage media as recited in claim 15, wherein the program instructions when executed on or across the one or more processors further cause the one or more processors to:
    receive, from the edge device, via a secure connection between the edge device and the intermediary device of the remote network based on the client certificate, another certificate signing request; and
    cause a new client certificate to generated for the edge device based on the other certificate signing request, wherein the new client certificate is signed by the CA and delivered to the edge device.

19. The one or more storage media as recited in claim 15, wherein to receive the certificate signing request from the edge device, the program instructions when executed on or across the one or more processors further cause the one or more processors to:
    receive the certificate signing request via an edge certificate management service of the intermediary device of the remote client network, and wherein the client certificate is also delivered to the edge certificate management service subsequent to the signing of the client certificate by the CA.

20. The one or more storage media as recited in claim 15, wherein the program instructions when executed on or across the one or more processors further cause the one or more processors to:
    receive, from an edge certificate management service of the intermediary device of the remote client network, an indication that the client certificate has been revoked; and
    in response to the reception of the indication that the client certificate has been revoked, add the client certificate to a certificate revocation list associated with the CA.

* * * * *